/

US 7,558,796 B1

(12) United States Patent
Bromwich et al.

(10) Patent No.: US 7,558,796 B1
(45) Date of Patent: Jul. 7, 2009

(54) DETERMINING ORIGINS OF QUERIES FOR A DATABASE INTRUSION DETECTION SYSTEM

(75) Inventors: Adam Bromwich, Santa Monica, CA (US); Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 423 days.

(21) Appl. No.: 11/133,498

(22) Filed: May 19, 2005

(51) Int. Cl.
*G06F 17/30* (2006.01)
(52) U.S. Cl. .............................. 707/10; 707/6; 726/12; 726/23
(58) Field of Classification Search ................. 707/3–6, 707/10, 101, 104.1; 726/12, 23
See application file for complete search history.

(56) References Cited

U.S. PATENT DOCUMENTS

| 4,959,849 | A | 9/1990 | Bhusri |
| 5,355,474 | A | 10/1994 | Thuraisngham et al. |
| 5,584,024 | A | 12/1996 | Shwartz |
| 5,664,172 | A | 9/1997 | Antoshenkov |
| 5,742,806 | A | 4/1998 | Reiner et al. |
| 5,826,076 | A | 10/1998 | Bradley et al. |
| 6,088,803 | A | 7/2000 | Tso et al. |
| 6,128,740 | A | 10/2000 | Curry et al. |
| 6,311,278 | B1 | 10/2001 | Raanan et al. |
| 6,314,409 | B2 | 11/2001 | Schneck et al. |
| 6,356,887 | B1 | 3/2002 | Berenson et al. |
| 6,584,569 | B2 | 6/2003 | Reshef et al. |
| 6,598,038 | B1 | 7/2003 | Guay et al. |
| 6,769,009 | B1 * | 7/2004 | Reisman ..................... 709/201 |
| 6,775,657 | B1 | 8/2004 | Baker |
| 6,775,827 | B1 | 8/2004 | Harkins |
| 6,839,850 | B1 | 1/2005 | Campbell et al. |
| 6,928,553 | B2 | 8/2005 | Xiong et al. |
| 7,085,780 | B2 | 8/2006 | Sakamoto et al. |
| 7,085,928 | B1 | 8/2006 | Schmid et al. |

(Continued)

FOREIGN PATENT DOCUMENTS

WO    WO 01/71499 A1    9/2001

OTHER PUBLICATIONS

Krugel et al. "A Survey on Intrusion Detection Systems" Dec. 12, 2000. Technical University of Vienna Information Systems Institute Distributed Systems Group.*

(Continued)

*Primary Examiner*—Leslie Wong
(74) *Attorney, Agent, or Firm*—Fenwick & West LLP (57) ABSTRACT

A database intrusion detection system (DIDS) monitors database queries to detect anomalous queries that might by symptomatic of a code injection attack on the database. A proxy server intercepts HTTP messages from clients that contain query data used to generate database queries. The proxy server extracts the query data from a message and determines origin data describing the origin of the message, such as the IP address of the client that sent the message. The proxy server stores the query and origin data in a cache. Upon detecting an anomalous query, the DIDS extracts a portion of the query, such as the literals. The DIDS searches the cache to identify entries having query data that match the extracted portions of the query. The DIDS reports the origin data of the matching cache entries.

16 Claims, 5 Drawing Sheets

U.S. PATENT DOCUMENTS

| | | | |
|---|---|---|---|
| 7,120,645 B2 | 10/2006 | Manikutty et al. | |
| 7,120,933 B2 | 10/2006 | Mattsson | |
| 7,124,173 B2* | 10/2006 | Moriarty | 709/219 |
| 7,185,232 B1 | 2/2007 | Leavy et al. | |
| 7,237,265 B2 | 6/2007 | Reshef et al. | |
| 7,254,626 B1* | 8/2007 | Kommula et al. | 709/223 |
| 7,308,715 B2* | 12/2007 | Gupta et al. | 726/23 |
| 2002/0065896 A1 | 5/2002 | Burakoff et al. | |
| 2002/0083343 A1 | 6/2002 | Crosbie et al. | |
| 2002/0087882 A1 | 7/2002 | Schneider et al. | |
| 2002/0157020 A1 | 10/2002 | Royer | |
| 2003/0037251 A1 | 2/2003 | Frieder et al. | |
| 2003/0051026 A1 | 3/2003 | Carter et al. | |
| 2003/0069880 A1 | 4/2003 | Harrison et al. | |
| 2003/0101355 A1 | 5/2003 | Mattsson | |
| 2003/0133554 A1 | 7/2003 | Nykanen et al. | |
| 2003/0145226 A1 | 7/2003 | Bruton et al. | |
| 2003/0154402 A1 | 8/2003 | Pandit et al. | |
| 2003/0167229 A1 | 9/2003 | Ludwig et al. | |
| 2003/0188189 A1 | 10/2003 | Desai et al. | |
| 2003/0204719 A1 | 10/2003 | Ben-Itzhak | |
| 2003/0221123 A1 | 11/2003 | Beavers | |
| 2004/0098617 A1 | 5/2004 | Sekar | |
| 2004/0098623 A1 | 5/2004 | Scheidell | |
| 2004/0193656 A1 | 9/2004 | Pizzo et al. | |
| 2004/0199535 A1 | 10/2004 | Zuk | |
| 2004/0205360 A1 | 10/2004 | Norton et al. | |
| 2004/0220915 A1 | 11/2004 | Kline et al. | |
| 2004/0250127 A1 | 12/2004 | Scoredos et al. | |
| 2004/0250134 A1 | 12/2004 | Kohler et al. | |
| 2004/0260945 A1 | 12/2004 | Raikar et al. | |
| 2005/0071643 A1* | 3/2005 | Moghe | 713/182 |
| 2005/0086529 A1 | 4/2005 | Buchsbaum | |
| 2005/0097149 A1 | 5/2005 | Vaitzblit et al. | |
| 2005/0138006 A1 | 6/2005 | Bennett et al. | |
| 2005/0138110 A1* | 6/2005 | Redlich et al. | 709/201 |
| 2005/0138426 A1 | 6/2005 | Styslinger | |
| 2005/0154733 A1 | 7/2005 | Meltzer et al. | |
| 2005/0192995 A1* | 9/2005 | Li et al. | 707/101 |
| 2005/0203886 A1 | 9/2005 | Wong | |
| 2005/0203921 A1 | 9/2005 | Newman et al. | |
| 2005/0273859 A1 | 12/2005 | Chess et al. | |
| 2005/0289187 A1* | 12/2005 | Wong et al. | 707/200 |
| 2006/0070128 A1 | 3/2006 | Heimerdinger et al. | |
| 2006/0117386 A1 | 6/2006 | Gupta et al. | |
| 2006/0212438 A1 | 9/2006 | Ng | |
| 2006/0212941 A1 | 9/2006 | Bronnikov et al. | |
| 2006/0242136 A1 | 10/2006 | Hammond et al. | |
| 2006/0265689 A1* | 11/2006 | Kuznetsov et al. | 717/117 |
| 2007/0074188 A1 | 3/2007 | Huang et al. | |
| 2007/0094728 A1 | 4/2007 | Julisch et al. | |
| 2007/0169194 A1 | 7/2007 | Church et al. | |

OTHER PUBLICATIONS

Chung, C.Y. et al., "DEMIDS: A Misuse Detection System For Database Systems," Department Of Computer Science, University Of California At Davis, Oct. 1, 1999, pp. 1-18.

Johnson R., Protecting Your Data and Your Microsoft SQL Server, Entercept Security Technologies, pp. 1-12 [online], Oct. 2, 2002, [retrieved on Jan. 30, 2004]. Retrieved from the Internet:: <URL: http://networkassociates.com/us/tier2/products/media/mcatee/wp-sq/protection.pdf>.

Kr ügel, C. et al., "A Survey On Intrusion Detection Systems," Distributed Systems Group, Technical University of Vienna, Dec. 12, 2000, pp. 1-36.

Lee, S.Y. et al., "Learning Fingerprints For A Database Intrusion Detection System," ESORICS 2002, LNCS 2502, pp. 264-279, Nov. 2002, Springer-Verlag, Germany.

Low, W.L. et al., "DIDAFIT: Detecting Intrusions In Databases Through Fingerprinting Transactions," ICEIS 2002—Databases And Information Systems Integration, 2002, pp. 121-128.

Ramasubramanian, P. et al., "Quickprop Neural Network Ensemble Forecasting Framework For A Database Intrusion Prediction System," Neural Information Processing—Letters And Reviews, Oct. 2004, pp. 9-16, vol. 5, No. 1.

Solutions by Tech Target, Entercept Database Edition, Nov. 2002, [retrieved on Jan. 9, 2004]. Retrieved from the Internet: <URL: http://infosecuritymag.techtarget.com/2002/nov/solutions.shtml>.

Valeur, F. et al, "A Learning-Based Approach To The Detection Of SQL Attacks," Proceedings of the Conference on Detection of Intrusions and Malware & Vulnerability Assessment (DIMVA) , Vienna, Austria, Jul. 2005, 18 pages.

Kruegel, C. et al., "Anomaly Detection of Web-Based Attacks," CCS'03, Oct. 27-31, 2003, ACM, pp. 251-261.

Archive of "Postgre SQL 7.1 Documentation," www.postgresql.org, [online] [Archived by http://archive.org on Jun. 6, 2001; Retrieved May 2001] Retrieved from the Internet<URL:http://web.archive.org/web/20010606011227/www.postgresql.org/idocs/index.php?overv...>.

Halfond, G.J. et al., "Combining Static Analysis and Runtime Monitoring to Counter SQL-Injection Attacks," Workshop on Dynamic Analysis (WODA 2005), May 17, 2005, St. Louis, MO, USA, pp. 1-7.

Oracle, Understanding Query Expressions, Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.

Pfleeger, Charles P., "Security in Computing," $2^{nd}$ edition, 1996, pp. 426-433.

Weisstein, E.W., "The CRC Concise Encyclopedia of Mathematics," 1998, p. 1726.

AirCERT web page, last updated Sep. 18, 2000 [online]. Cert.org [retrieved Apr. 18, 2003]. Retrieved from the Internet<URL:http://www.cert.org/kb/aircert/>.

Analysis Console for Intrusion Detection (ACID) web page [online]. Andrew.cmu.edu [retrieved Apr. 18, 2003]. Retrieved from the Internet<URL:http://www.andrew.cmu.edu/~rdanyliw/snort/snortacid.html>.

"Caltarian Security Technology Platform," Riptech web pages [online]. Symanec.com [retrieved Apr. 18, 2003]. Retrieved from the Internet<URL:http://wnterprisesecurity.symantec.com/Content/displayPDF.cfm?SSSPDFID=35&EID=O>.

Change log for Analysis Console for intrusion Detection (Acid), indicating release date of Sep. 8, 2000 [online]. Andrew.cmu.edu [retrieved Apr. 18, 2003]. Retrieved from the Internet:<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=Security, Inc., Correlation Technology for Security Event Management, Oct. 7, 2002 [online]. eSecurityins.com [retrieved on Apr. 18, 2003]. Retrieved from the Internet:<URL:http://www.esecurityinc.com/downloads/Correlation_WP.pdf>.

Marketing, "Digital Cerificates—Best Practices—A Microdasys Whitepaper," bestpractice.doc, Revision 1.1 (Jul. 31, 2003), 6 pages, Czech Republic.

Microdasys, "S C I P Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Network Computing Solutions—"Microdasys SCIP"[online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet<URL:http://nsc.cz/index/php?language=en&menuitem=0&subitem=13>, 3 pages, Czech Republic.

Parkhouse, Jayne, "Pelican Save TNet 2.0," [online] Jun. 2000, SC Magazine Product Review, [retrieved Dec. 1, 2003] Retrieved from the Internet<URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the Internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce, Managed Security Monitoring: Network Security for the 21$^{st}$ Century, 2001 [online]. Conterpane.com [retrieved Apr. 18, 2003]. Retrieved from the Internet:<URL:http://www.counterpane.com/msm.pdf>.

SCIP Product, Microdasys—"The need to control, inspect and manage encrypted webtraffic." [online]. Retrieved on Mar. 18, 2005. Retrieved from the Internet<URL:http://www.microdasys.com/scipproduct+M54a708de802.html>. Author unknown, 2 pages, Czech Republic.

Slashdot.org web pages describing Dshield, dated Nov. 27, 2000 [online]. Slashdot.org [retrieved Apr. 18, 2003]. Retrieved from the Internet:<URL:http://slashdot.org/article.pl?sid=00/11/27/1957238&mode=thread>.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

"SSL Stripper Installation Guide," [online]. Retrieved in Mar. 2005 from the Internet<URL:http://www.sslstripper.com>, 2 pages, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups/google.com/groups?selm=8vm48v%245pd%241%40nnrp1.deja.com&oe=UTF-8&output=gplain>.

Webwasher AG/Full feature set, "Full feature set," [online]. Retrieved on Mar. 18, 2005. Retrieved from the Internet<URL:http://www.webwasher.com/enterprise/products/webwasher_products/ssl_scanner/full_feature set..html?l...>, 2 pages.

Webwasher AG/Webwasher Anti Spam, "Webwasher Anti Spam," [online]. Retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Retrieved on Mar. 18, 2005. Retrieved from the Internet<URL:http://www.webwasher.com/enterprise/products/webwasher_products/anti-virus/index.html..>, 2 pages.

Webwasher AG/Webwasher Content Protection, "Webwasher Content Protection," [online]. Retrieved on Mar. 18, 2005, Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance," [online]. Retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Retrieved on Mar. 118, 2005, Retrieved from the Internet:<URL:http://www.webwasher.com/enterprise/products/webwasher_products/ssl_scanner/index.html>, 2 pages.

Webwasher AG/Webwasher URL Filter, "Webwasher URL Filter," [online]. Retrieved on Mar. 18, 2005. Retrieved from the Internet<URL:http://www.webwasher.com/enterprise/products/webwasher_products/webwasher_url_filter..>, 1 page.

Retrieved from the Internet<URL:http://www.webwasher.com/enterprise/products/webwasher_products/webwasher_url_filter..>, 1 page.

* cited by examiner

DETERMINING ORIGINS OF QUERIES FOR A DATABASE INTRUSION DETECTION SYSTEM

BACKGROUND OF THE INVENTION

1. Field of the Invention

This invention pertains in general to computer security and in particular to detecting database intrusion and data theft attempts.

2. Description of the Related Art

Databases are widespread in modern computing environments. Companies and other enterprises rely on databases to store both public and private data. Many enterprises provide publicly-accessible interfaces to their databases. For example, an electronic commerce web site typically includes a "search" field that accepts search terms and allows an end-user to search items for sale on the site. This search field is a publicly-accessible interface to a database that stores data describing the items for sale. Similarly, an application used by an enterprise, such as customer relationship management (CRM) software, utilizes a database to store its data. The enterprise application has an interface that employees can use to submit queries to the database.

At a technical level, many of these databases work by having a web server provide a web browser executing on the client with an HTML and/or JavaScript-based form. The web browser displays this form on the client, and the end-user, such as a person searching a web site or an employee accessing CRM data, provides values for the fields in the form. The end-user performs an action, such as pressing a "Submit" button, that causes the web browser to send the entered values to the server. The web server extracts the values provided by the end-user and passes them to an enterprise application. The enterprise application generates a query using the user-supplied values and sends the query to the database. The database executes the query and provides the results to the enterprise application. The enterprise application passes the results back to the web server, which in turn provides the results to the end-user.

Malicious end-users can exploit the web interface to the database to perform malicious actions such as obtaining access to confidential information. For example, in an SQL (Structured Query Language) injection attack, the attacker fills out the form using specially-crafted values. These values, when used by the enterprise application to generate a query to the database, result in a malicious query being sent to the database on behalf of the attacker. The malicious query can cause the database to reveal confidential information or perform other malicious actions.

A database intrusion detection system (DIDS) attempts to detect malicious queries. The DIDS is usually located between the enterprise application and the database so that it has visibility to the database queries and results. Typically, the DIDS is trained to recognize legitimate queries. If the DIDS recognizes an anomalous query, it logs the query and may perform other actions, such as triggering an alert to an administrator or blocking execution of the query.

Ideally, the DIDS would report the source of the anomalous query in order to allow an administrator to identify the attacker. However, the DIDS does not have access to origin information due to its position between the enterprise application and the database. In most instances, the enterprise application logs into the database using login credentials unique to the application. All queries from the enterprise application to the database thus appear to be originated by the application. While it is conceivable that the enterprise application could use different login credentials for queries from different end-users, or that the end-users could log into the database under their own credentials, such implementations are undesirable from maintenance and security standpoints. As a result, the DIDS cannot determine the true origin of an anomalous database query.

Therefore, there is a need in the art for a way to allow a DIDS to determine the origin of an anomalous query. An administrator could use such information to track down an attacker who is submitting malicious database queries.

BRIEF SUMMARY OF THE INVENTION

The above need is met by using a proxy server to determine the origin of messages from clients that are used to generate database queries. The proxy server intercepts HTTP messages from clients before the messages are converted to database queries. The HTTP messages contain query data, such as form data submitted using a POST method, that are used by an enterprise application to create the database queries. The proxy server extracts the query data from the messages and also determines origin data describing the origins of the messages. The origin data can include the IP address of the client that sent the message, the machine name of the client, and/or the end-user's login identity. The proxy server stores the query and origin data in a cache.

A DIDS monitors database queries to detect anomalous queries that might by symptomatic of a code injection attack. Upon detecting an anomalous query, the DIDS extracts a portion of the query, such as the literals. The DIDS searches the cache to identify an entry having query data that match the extracted portions of the query. The DIDS reports the origin data of the matching cache entries by, for example, writing the origin data to a log file.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
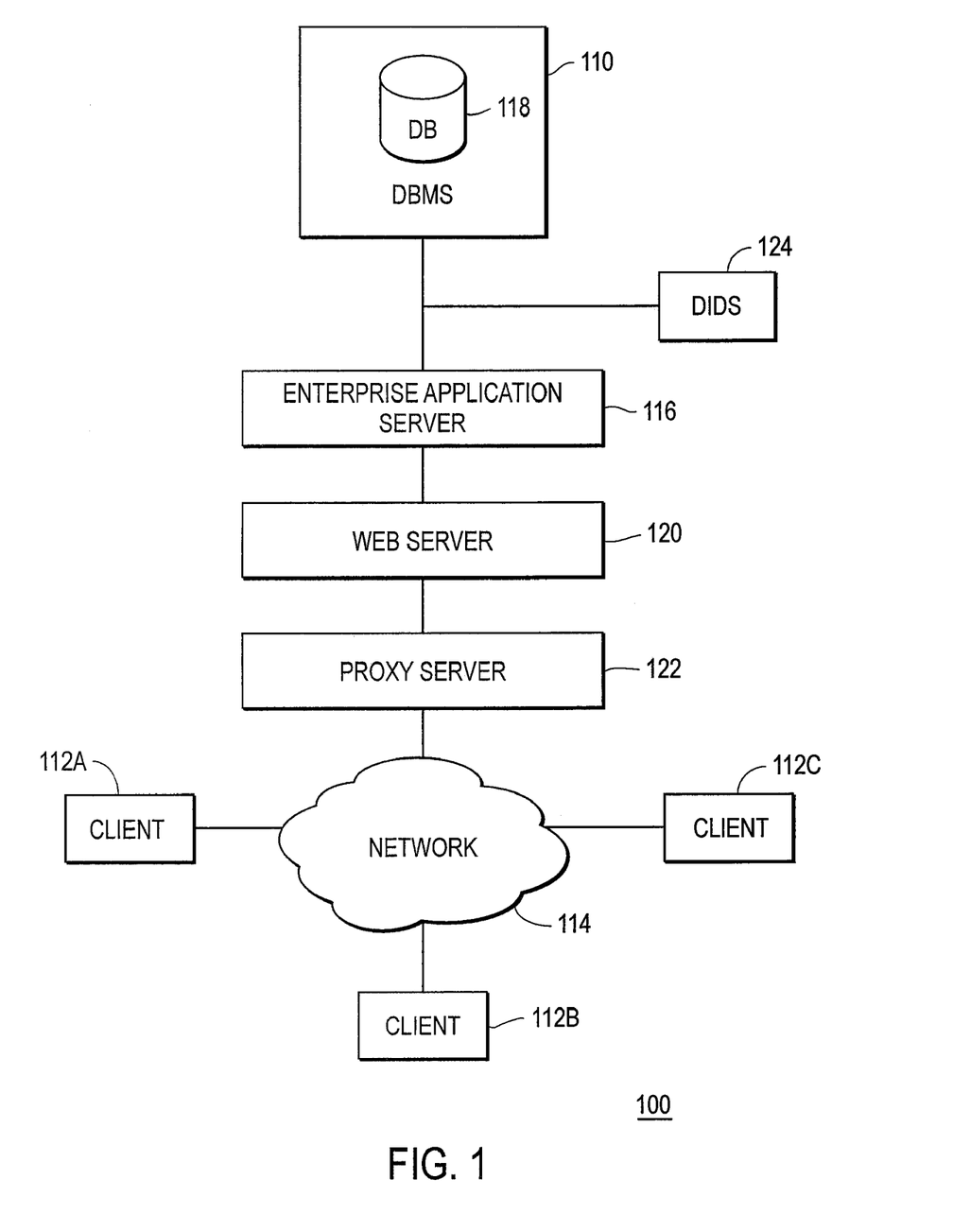
FIG. 1 is a high-level block diagram illustrating a view of a typical environment where it is desirable to determine the sources of anomalous database queries.

FIG. 1 is a high-level block diagram illustrating a view of a typical environment 100 where it is desirable to determine the sources of anomalous database queries. The environment 100 includes a database management system (DBMS) 110 in communication with multiple client computers 112 via a network 114. Only three client computers 112 are shown in FIG. 1 for purposes of clarity, but those of skill in the art will recognize that typical environments can have hundreds or thousands of client computers 112, and can also have multiple DBMS 110. There can also be other computers connected to the network 114 beyond those shown in FIG. 1.

FIG. 1 and other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 enables data communication between and among the entities shown in FIG. 1 and in one embodiment is the Internet. In another embodiment, the network 114 is a local area network (LAN) or wide area network (WAN) operated by an enterprise and is not necessarily coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The DBMS 110 is connected to the network 114 and manages a database 118 that stores a collection of information. The information can include, for example, names, addresses, credit card numbers, products offered for sale, medical histories, etc. In one embodiment the database 118 is a relational database and in another embodiment the database is a flat-file database. Although database 118 is shown within the DBMS 110, it can in fact be external and/or remote from the DBMS. Depending upon the embodiment, the DBMS 110 and/or database 118 can be centralized at one location or distributed over multiple locations. The DBMS 110 receives database queries, executes the queries on the database 118, and provides the results of the queries in response. In order to access the DBMS 110 and execute queries on the database 118, an entity must provide authentication credentials such as login/ password pair.

An enterprise application server 116 is connected to the network 114 and executes an enterprise application that generates queries to the DBMS 110 based on values provided by the clients 112, and receives the query results from the DBMS 110 in response. In one embodiment, the queries are formulated in the Structured Query Language (SQL), but other embodiments can use other languages or techniques for representing the queries. In one embodiment, the enterprise application server 116 executes a customer relationship management (CRM) application that enables an enterprise to manage its customer contacts using the database 118. There are a variety of other enterprise applications that the enterprise application server 116 can execute instead of, or in addition to, the CRM application. An administrator logs the enterprise application into the DBMS 110 using authentication credentials associated with the enterprise application.

In one embodiment, a web server 120 connected to the network 114 acts as an intermediary between the client computers 112 and the enterprise application server 116. The web server 120 functionality can also be integrated into the enterprise application server 116 or vice-versa. Those of ordinary skill in the art will understand that the web server 120 is absent in some embodiments.

In one embodiment, the web server 116 exchanges data with the client computers 112 using HTTP and/or other protocols. The exchanged data provides a means by which the client computers 112 can access the database 118. The web server 116 receives data describing queries from the client computers 112, sends the data to the enterprise application server 116, receives the results of the queries based on the data from the application server, and provides these results to the client computers 112.

For example, the web server 116 can use HTTP to provide the client computers 112 with encoded web pages having forms for entering data. Browsers on the client computers 112 display the forms, and end-users input data into the forms and instruct the browsers to provide the entered data to the web server 116. The web server 116 receives and extracts the data and provides it to the enterprise application server 116, which uses the data to generate the database queries. The web server 116 provides the results of the queries to the client computers 112 via new encoded web pages.

In another example, the web server 116 uses web services to interact with the client computers 112. The web server 116 utilizes an XML schema that is provided to, or otherwise known by, the client computers 112. The web server 110 receives messages encoded using the XML schema from the client computers 112 via SOAP over HTTP. The web server 116 parses the XML-encoded messages to extract data, and provides the data to the enterprise application server 116.

In one embodiment, a proxy server 122 is connected to the network 114 and resides between the web server 120 and the clients 112. In other embodiments, the proxy server 122 resides at other locations where it is able to observe communications between the clients 112 and the web server 120. In one embodiment the functionality of the proxy server 122 is provided by a web server plug-in or otherwise integrated into the web server 120. In another embodiment, the functionality of the proxy server 122 is integrated into a firewall, router, and/or other networking device.

The proxy server 122 monitors HTTP communications from the clients 112 to the web server 120 and identifies communications that include values that will be used in database queries. To this end, one embodiment of the proxy server 122 identifies HTTP communications that include a POST method, because POST is the typical way that a client 112 provides values for a query to the web server 120. Likewise, the proxy server 122 identifies HTTP communications that include a GET method with form parameters embedded in the URL, since this is also a typical way for a client 112 to provide query values to the web server 120. Other embodiments monitor for instances of other HTTP methods.

The proxy server 122 records the query data sent by the clients 112 via the HTTP communications. For example, the proxy server 122 can record the form data posted using the POST and GET methods. In addition, the proxy server 122 also records the origins of HTTP communications from the clients 112. Thus, the proxy server 122 stores and associates the query data of a communication with the data describing the origin of that communication.

In one embodiment, a database intrusion detection system (DIDS) 124 is connected to the network 114 between the enterprise application server 116 and the DBMS 110. In other embodiments, the DIDS 124 is connected to the network 114 at another location where it can monitor data exchanged between the enterprise application server 116 and the DBMS 110. In one embodiment, all or some of the functionality of the DIDS 124 is integrated into the DBMS 110 and/or web server 120. The DIDS 124 can communicate with the proxy server 122 via the network 114 and/or a direct link.

The DIDS 124 monitors the queries sent to the DBMS 110, and in some embodiments also monitors the results of the queries output by the DBMS. The DIDS 124 detects anomalous queries such as those containing code injection attacks. If the DIDS 124 detects an anomalous query, it isolates the literals and/or other portions of the query and contacts the proxy server 122 to determine the origin of the HTTP message that caused the query to be generated. The DIDS 124 records the origin of the message 112 in a log file or uses another reporting technique.

The client computers 112 are utilized by end-users to interact with the enterprise application server 116 and the database 118. In one embodiment, a client computer 112 is a typical personal computer such as an IBM-PC or Apple Macintosh compatible computer. In another embodiment, a client computer 112 is another type of electronic device, such as a cellular telephone, personal digital assistant (PDA), portable email device, etc. In one embodiment, a client computer 112 executes a web browser that receives an encoded web page from the web server 116 and displays it to the end-user. The web page contains a form for accepting information. The end-user uses a keyboard or other user input device to provide information to the form, and the web browser encodes the information and sends it to the web server 116. In another embodiment, a client computer 112 executes a program for interfacing with the web server 116 using web services.

Figure 2:
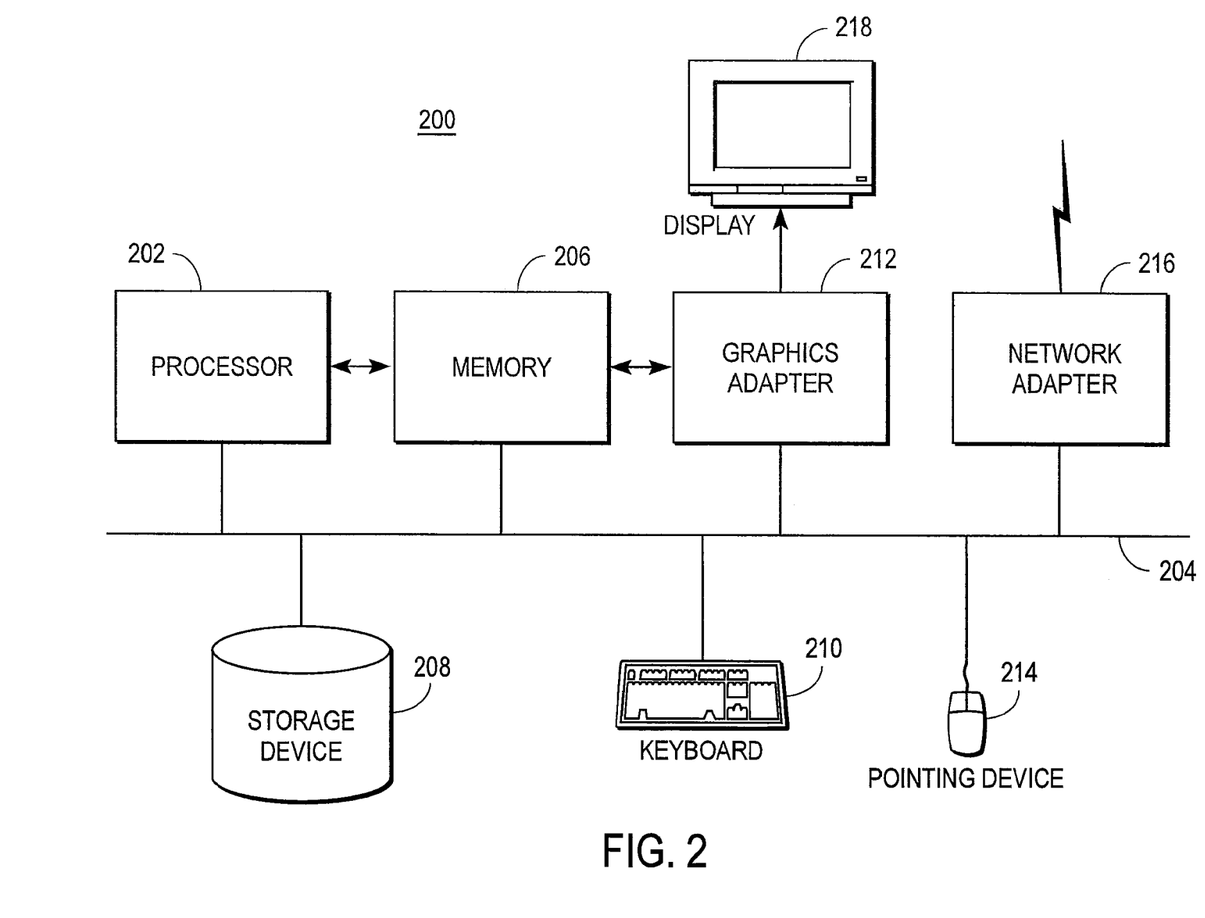
FIG. 2 is a high-level block diagram showing a computer system for acting as a client, proxy server, DIDS, and/or other entity shown in FIG. 1 according to one embodiment.

FIG. 2 is a high-level block diagram showing a computer system 200 for acting as a client 112, proxy server 122, DIDS 124, and/or other entity shown in FIG. 1 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. Computer systems acting in different roles may have different and/or additional elements than the ones shown in FIG. 2. For example, a computer system 200 acting as a DBMS 110 may have greater processing power and a larger storage device than a computer system acting as a client computer 112. Likewise, a computer system acting as a proxy server 122 may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. When utilized, the modules are loaded into the memory 206 and executed by the processor 202.

Figure 3:
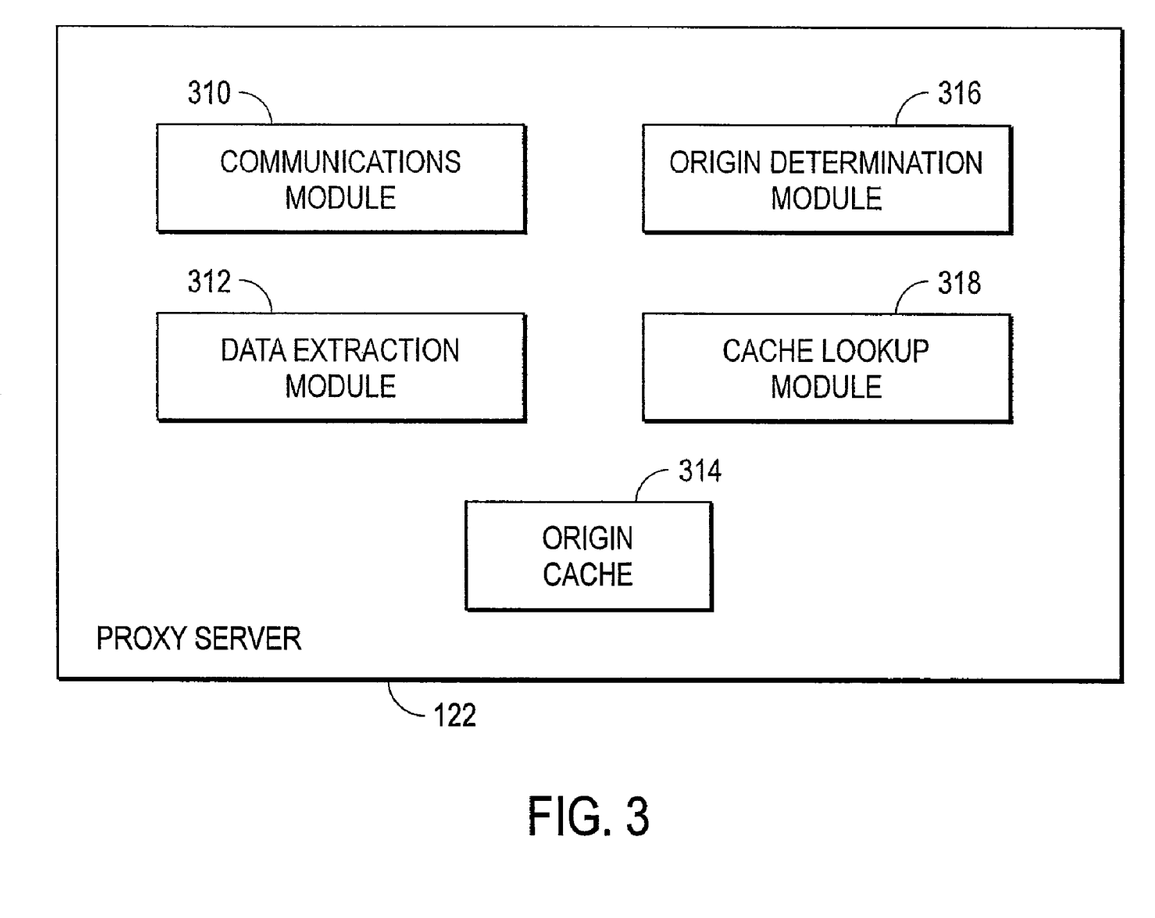
FIG. 3 is a high-level block diagram illustrating a more detailed view of the proxy server according to one embodiment.

FIG. 3 is a high-level block diagram illustrating a more detailed view of the proxy server 122 according to one embodiment. Those of skill in the art will recognize that other embodiments can have different and/or additional modules than those shown in FIG. 3 and the other figures. Likewise, the functionalities can be distributed among the modules in a manner different than described herein.

The proxy server 122 includes a communications module 310 for monitoring communications on the network 114. In one embodiment, the communications module 310 sniffs (i.e., observes but does not alter) network traffic sent between the clients 112 and the web server 120. In another embodiment, the communications module 310 intercepts communications from the clients 112 to the web server, and then sends the communications to the web server after the proxy server 122 completes its analysis of the communications. The communications module 310 also supports communications with the DIDS 124.

A data extraction module 312 identifies communications from the clients 112 that are likely used to create database queries and extracts identifying terms from those communications. These identifying terms are called "query data." In one embodiment, the data extraction module 312 identifies messages from the clients 112 that submit form data to the web server 112. Typically, these messages contain invocations of either the HTTP GET or POST methods. The data extraction module 312 extracts the form data from the message, and saves the form data in an origin cache 314 as, for example, one or more text strings.

An origin determination module 316 determines the origins of messages sent to the web server 120 that are likely to be used to create queries. In one embodiment, the origin determination module 316 captures information identifying any client 112 that posts form data to the web server 120. There are multiple types of origin data that the origin determination module 316 can use to identify a client 112, such as the client's IP address, machine name, media access control (MAC) address, etc. In one embodiment, the end-user of a client 112 must supply authentication credentials, such as a username and password, to the enterprise application server 116 in order to use the enterprise application. The origin determination module 316 captures the authentication credentials and associates it with all messages from that client 112. This stateful monitoring allows the origin determination module 316 to identify the specific end-users that submit messages to the web server 120.

Whether these different types of origin data are available to the origin determination module 316 depends upon factors such as the type of network 114, the presence of routers or other intermediate devices between the clients 112 and the proxy sever 122, the network protocols in use, etc. Thus, the particular origin data captured by the origin determination module 316 depends upon the embodiment. The origin determination module 316 saves the data in the origin cache 314 and associates it with the query data from the identified origin.

The origin cache 314 stores the origin data determined by the origin determination module 316 and the query data extracted by the data extraction module 312. The origin and query data are associated so that it is possible to identify the client 112 and/or other entity that submitted particular query data. For example, a set of cache entries might appear as follows:

| Origin Data | Query Data |
| --- | --- |
| 192.168.0.5 | "Blues, Elwood" |
| 192.168.0.17 | "B263-1655-2187" |
| 192.168.0.99 | "1060 W. Addison St." |

Thus, an entry includes origin data identifying the client 112 or other entity that sent the query data (e.g., 192.168.0.17) and one or more text strings that comprise the query data (e.g., "B263-1655-2187"). In one embodiment, the origin cache 314 stores additional data about the origin and/or query that might be useful in order to identify the origin of an anomalous query, such as the time that a message was received, the number of times that a client 112 or other source has sent a particular message, etc.

In one embodiment, the origin cache 314 purges (i.e., deletes) the entries according to a caching policy in order to prevent the cache from growing too large. For example, if it is known that the cached data will be used within five minutes (if at all), the caching policy can be set to purge cache entries older than 5 minutes. Other embodiments use other caching policies.

A cache lookup module 318 receives search criteria from the DIDS 124 and/or another entity on the network 114 and identifies any entries in the origin cache 314 that satisfy the criteria. In one embodiment, the search criteria are text strings, and the cache lookup module 318 identifies entries in the origin cache 314 that have query data matching the text strings. The cache lookup module 318 can use fuzzy and/or other types of matching to identify query data that only partially satisfy the search criteria. In addition, the cache lookup module 318 can use a scoring system to identify a set of best-matching entries. In one embodiment, the cache lookup module 318 returns the matching entries, including the origin information and the query data, to the DIDS 124 and/or other entity that specified the search criteria.

In one embodiment, the origin cache 314 and/or cache lookup module 318 are remote from the proxy server 122. For example, these two entities can reside in the DIDS 124 and the proxy server 122 can send the query and origin data to the DIDS 124 via the network 114.

Figure 4:
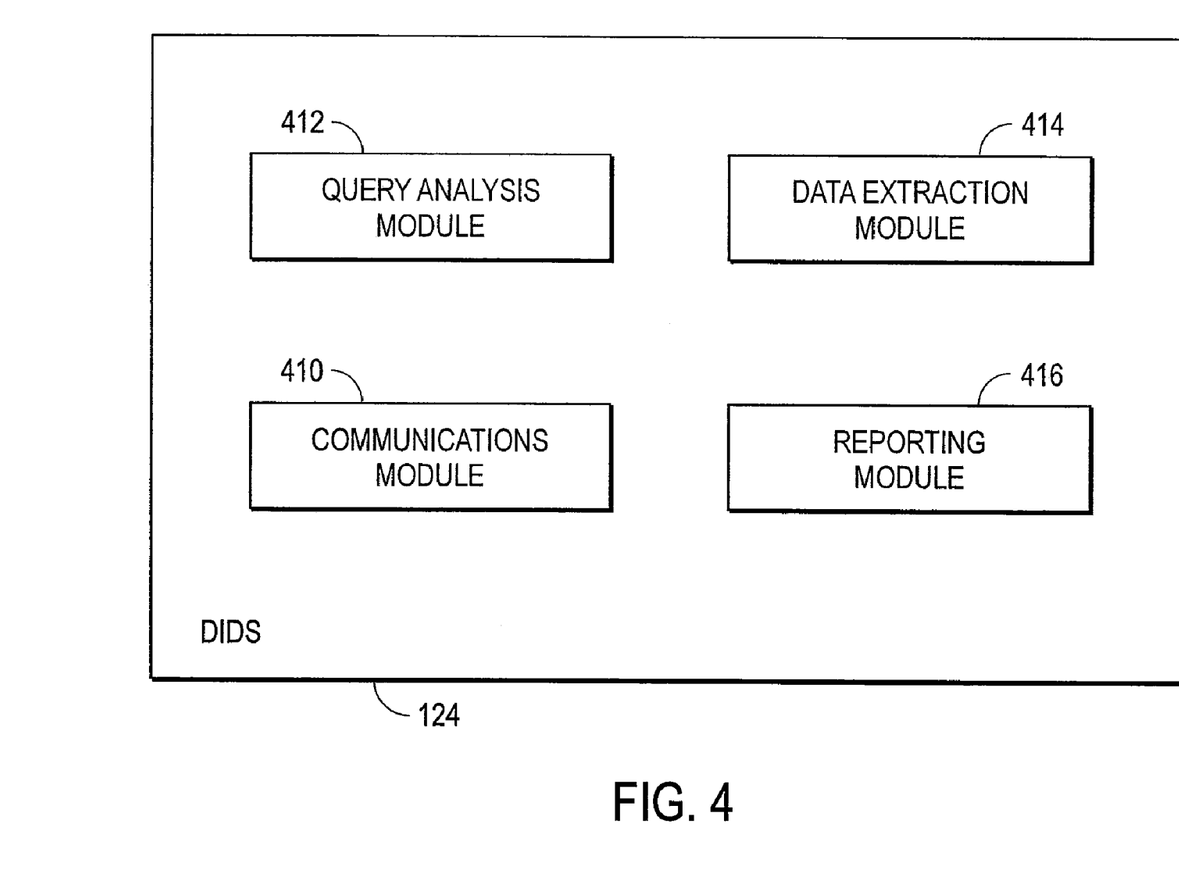
FIG. 4 is a high-level block diagram illustrating a more detailed view of the DIDS according to one embodiment.

FIG. 4 is a high-level block diagram illustrating a more detailed view of the DIDS 124 according to one embodiment. A communications module 410 monitors data sent to and from the DBMS 110. These data include incoming queries from the enterprise application server 116, and outgoing data provided by the DBMS server 110 in response to the queries. In addition, the communications module 410 enables communications with the proxy server 122 and the other entities on the network 114.

A query analysis module 412 examines the incoming queries received by the communications module 410 and classifies the queries as legitimate or anomalous. In one embodiment, the query analysis module 412 utilizes a set of query templates to classify an incoming query. The query templates describe legitimate queries on the database 118. In one embodiment, the templates in the set are initially generating by observing the queries received by the DBMS 110 during a training period. Each observed query is canonicalized (i.e., generalized) to match different instances of the same query and is added to the set of query templates.

For example, in one embodiment a query is canonicalized by removing the literals (i.e., the specific string and/or numeric values) from the parameterizable fields of the query. Consider the following two non-canonicalized SQL queries:

SELECT*FROM USERS WHERE NAME='cindy' AND PASS='boop'
    SELECT*FROM USERS WHERE NAME='abe' AND PASS='network'.

Each of these queries has two parameterizable fields, "NAME" and "PASS." These queries are canonicalized to a single query template as follows:

SELECT*FROM USERS WHERE NAME=' ' and PASS=' '.

In other embodiments, query templates are generated using other techniques in addition to, or instead of, the one described here.

In one embodiment, the query analysis module 412 converts an incoming query to canonical form and determines whether it matches a query template in the set. If the query matches, then it is classified as legitimate. If the canonicalized query does not match a template, then the query analysis module 412 classifies it as anomalous.

The query might be anomalous because it includes a code injection attack. To understand a code injection attack, consider what would happen if the end-user supplied the specially-crafted string;

'OR AGE>=0— as the name and "any" as the password for the query having the template given above. In the SQL embodiment, the enterprise application will construct the query as:

SELECT*FROM USERS WHERE NAME='′OR AGE>=0—' AND PASS='any'

The "—" sequence denotes a comment in SQL, so the DBMS 110 would interpret the resulting query as:

SELECT*FROM USERS WHERE NAME='′OR AGE>=0

This query will return all users from the USERS table where the user's name is equal to the empty string '' OR where the user's AGE (another field in the database in this example) is greater than or equal to zero years old. Since every user is at least zero years old, this injected query will select all users and return their results to the attacker.

The DIDS 124 observes a query containing a code injection attack and the query analysis module 412 classifies it as anomalous because it does not match any templates. A data extraction module 414 in the DIDS 124 identifies the portion of the anomalous query that can be used to determine the source of the query. These portions are ideally portions of the query that correspond most closely with the query data stored in the origin cache 314 of the proxy server 122. In one embodiment, the DIDS data extraction module 414 extracts the literals from the query because, in most cases, the literals are provided in the query data sent to the web server 120 by the client 112. Therefore, the literals from the query will match the query data provided by the client 112 and allow the DIDS to ascertain the origin of the anomalous query.

In another embodiment, the data extraction module 414 extracts parts of the query other than, or in addition to, the literals. A code injection attack can obfuscate the relationship between the query data sent by the client 112 and the literals in the query. In the exemplary code injection attack described above, the query data from the client 112 contains the strings "'OR AGE>=0—" and "any." There are many ways to interpret the resulting query, depending upon factors like whether the portions after the comment indicator are considered. Under one interpretation, the literals from the resulting query are "" (an empty string) and "0", and thus are not a particularly close match with the query data held in the origin cache 314.

To overcome this issue, one embodiment of the query analysis module 412 identifies a query as anomalous, and then analyzes the query further to determine whether the anomaly is caused by a code injection. This analysis can be performed by comparing the query with the closest-matching template query in order to identify any inserted code portions. If the query analysis module 412 concludes that the query contains a code injection, an embodiment of the data extraction module 414 extracts the injected code from the query (as determined by the comparison with the template query), e.g., "' OR AGE>=0—". This extracted portion of the query, like an extracted literal, will match the origin cache entry that result in the anomalous query because it contains the query data that was supplied by the attacker. Other embodiments use different and/or additional techniques to match anomalous queries with entries in the origin cache 314.

In one embodiment, the DIDS 124 includes a reporting module 416 for interacting with the proxy server 122 to determine the origin of an anomalous query and for reporting the origin. In one embodiment, the reporting module 416 sends the portions of the query identified by the DIDS data extraction module 414 to the proxy server 122 and receives the one or more matching origin cache entries in response. The reporting module 416 logs the anomalous query, the query data on which the query was based, the origin data associated with the query data, and/or other information that might be desirable to an administrator. In one embodiment, the reporting module 416 performs additional actions, such as logging legitimate queries, generating an alert to an administrator in response to certain queries, origin data, query data, etc. and/or blocking queries from executing.

Figure 5:
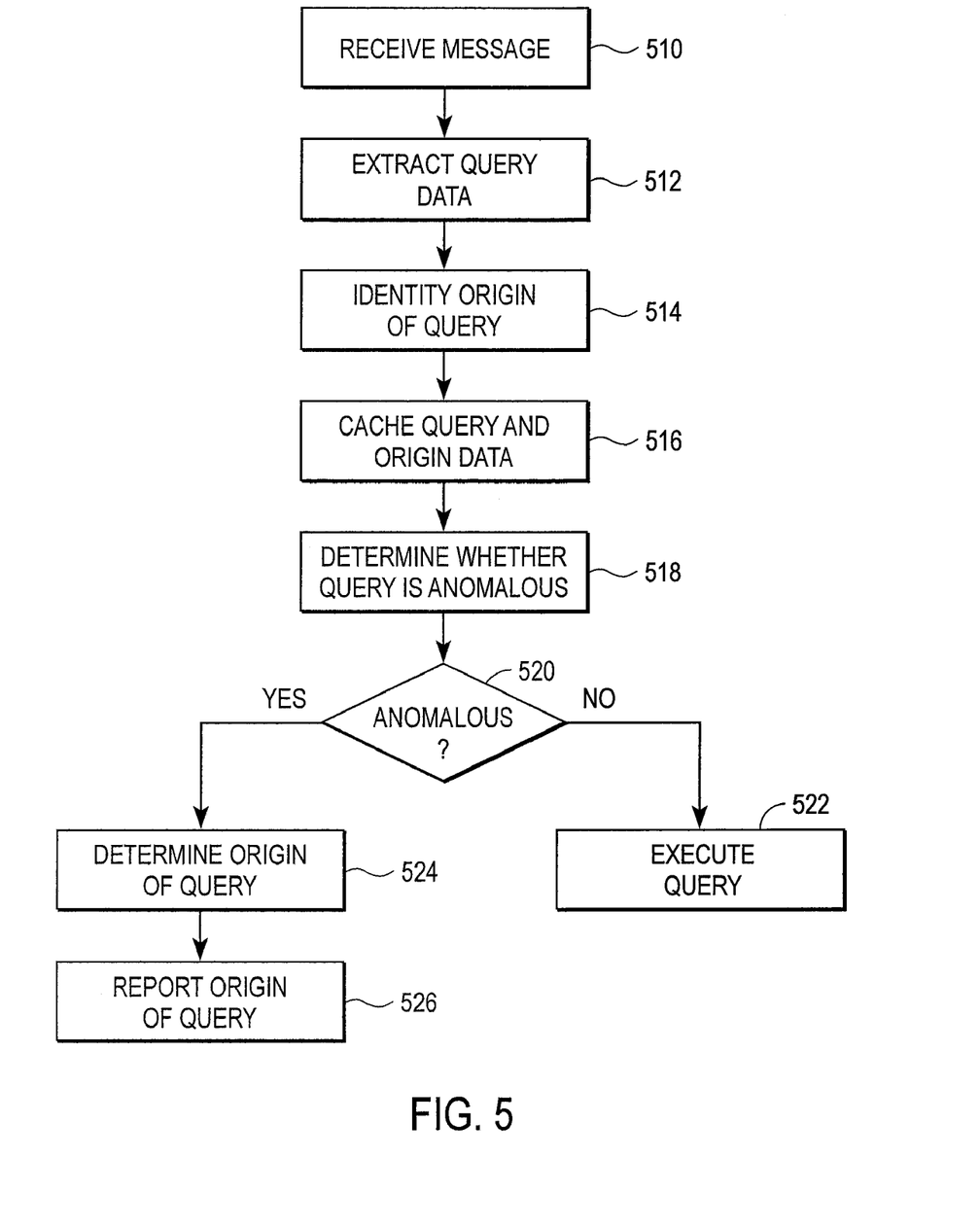
FIG. 5 is a flow chart illustrating steps performed by one embodiment of the invention.

FIG. 5 is a flow chart illustrating steps performed by one embodiment of the invention. In one embodiment, the illustrated steps are performed by the proxy server 122 and DIDS 124, although those of skill in the art will recognize that other entities can perform the steps in other embodiments. In addition, in other embodiments the steps can be performed in different orders than the one shown in FIG. 5. Moreover, other embodiments can include additional and/or other steps than the ones described here.

The proxy server 122 receives 510 a message destined for the web server 120. The message includes query data that will be used to generate a query on a database 118. For example, the message can be an HTTP message that posts a form to the web server 120. The proxy server 122 extracts 512 the query (e.g., form) data from the message. In addition, the proxy server 122 determines 514 the origin of the message. For example, the proxy server 122 can identify the IP address of the client 112 that sent the message. The proxy server 122 saves 516 the form and origin data in the origin cache 314.

In the standard case, the query data in the message are used to create a query to the database 118. The DIDS 124 observes the query and determines 518 whether it is legitimate or anomalous. If 520 the query is legitimate, the query is allowed to execute 522 on the database 118 in the normal fashion.

If 520 the query is anomalous, the DIDS 124 determines 524 the origin of the query. In one embodiment, the DIDS 124 makes this determination by extracting certain portions of the query, such as the literals, and providing the extracted portions to the proxy server 122. The proxy server 122 compares the query portions provided by the DIDS 124 with the query data in the origin cache 314 and returns the one or more closest matching entries to the DIDS 124. The DIDS 124 reports 526 the origin of the anomalous query by, for example, logging the origin data returned by the proxy server 122. Depending upon the embodiment, the anomalous query can execute 522 on the database as if it were legitimate or the DIDS 124 can block the query from executing.

In one embodiment not specifically described above, the proxy server 122 and DIDS 124 can be utilized to log the origin of every query submitted to the database 118. Such logging allows true auditing of database access by connecting each request with the requestor. In addition, this solution eliminates the need to customize applications to identify users as may be required by government regulations such as the Sarbanes-Oxley act and the Health Insurance Portability and Accountability Act (HIPAA).

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method of determining an origin of a database query, comprising:
   identifying query data in a network communication sent between a client and an application server;
   determining origin data describing an origin of the network communication sent between the client and the application server;
   storing the query data in correspondence with the origin data in a cache;
   identifying a portion of the database query derived from query data, the database query in a network communication between the application server and a database;
   searching the cache for a cache entry having query data matching the identified portion of the database query; and
   reporting the origin data corresponding to the matching query data.

2. The method of claim 1, wherein identifying a portion of the database query derived from query data comprises:
   identifying a literal in the database query.

3. The method of claim 1, wherein identifying a portion of the database query derived from query data comprises:
   identifying a portion of the database query containing a code injection.

4. The method of claim 1, wherein the query data in the network communication sent between the client and the application server comprise form data sent via a hypertext transport protocol (HTTP) message.

5. The method of claim 1, further comprising:
   determining an identification of an end-user that generated the network communication sent between the client and the application server; and
   saving the identification of the end-user in the cache as the origin data.

6. A system for determining an origin of a database query, comprising:
   a proxy server configured to receive communications between clients and an application server, the proxy server comprising:
      a processor; and
      a computer-readable storage medium having processor-executable computer program instructions recorded thereon comprising:
         a proxy server data extraction module configured to identify communications between clients and the application server for creating database queries, to extract portions of the communications for creating database queries, and to store the extracted portions in entries of a cache in correspondence with origin data describing origins of the identified communications; and
         a cache lookup module configured to receive identified portions of database queries, to search the cache for matching entries having extracted portions matching the identified portions, and to output origin data corresponding to the matching entries;

a database intrusion detection system (DIDS) configured to receive communications between the application server and a database, the DIDS comprising:
a processor; and
a computer-readable storage medium having processor-executable computer program instructions recorded thereon comprising:
a DIDS data extraction module configured to identify a portion of a database query derived from query data in a network communication between the application server and the database; and
a reporting module configured to provide the identified portion of the database query to the cache lookup module, to receive origin data of a matching entry in response, and to report the origin data.

7. The system of claim 6, wherein the DIDS data extraction module is configured to identify a literal in the database query.

8. The system of claim 6, wherein the DIDS data extraction module is configured to identify a portion of the database query containing a code injection.

9. The system of claim 6, wherein the extracted portions of the communications for creating database queries comprise form data sent via a hypertext transport protocol (HTTP).

10. The system of claim 6, wherein the proxy server further comprises
an origin determination module configured to determine origin data describing origins of identified communications between clients and the application server for creating database queries and to store the origin data in the cache.

11. A computer program product having a computer-readable storage medium having executable computer program instructions recorded thereon for determining an origin of a database query, the computer program instructions comprising:
a first data extraction module configured to identify a network communication for creating a database query destined for an application server, to extract query data from the identified network communication destined for the application server, and to store the query data in a cache;
an origin determination module configured to determine origin data describing an origin of the identified network communication destined for the application server and to store the origin data in the cache in correspondence with the extracted query data;
a second data extraction module configured to identify a portion of a database query in a network communication from the application server and destined for a database;
a cache lookup module configured to search the cache of query data and corresponding origin data for a cache entry having query data matching the identified portion of the database query; and
a reporting module configured to report the origin data corresponding to the matching query data.

12. The computer program product of claim 11, wherein the second data extraction module is configured to identify a literal in the database query and wherein the cache lookup module is configured to search the cache for a cache entry having query data matching the identified literal.

13. The computer program product of claim 11, wherein the second data extraction module is configured to identify a portion of the database query containing a code injection and wherein the cache lookup module is configured to search the cache for a cache entry having query data matching the identified portion of the database query containing the code injection.

14. The computer program product of claim 11, wherein the query data in the network communication destined for the application server comprise form data sent via a hypertext transport protocol (HTTP) message.

15. The computer program product of claim 11, further comprising:
an origin determination module configured to observe a network communication destined for the application server including authentication credentials for an end-user of a client and to store the authentication credentials in a cache entry associated with a subsequent network communication destined for the application server from the client.

16. The computer program product of claim 11, wherein the cache is configured to purge entries in the cache according to a caching policy.

\* \* \* \* \*